United States Patent
Zhao et al.

(10) Patent No.: US 10,802,748 B2
(45) Date of Patent: Oct. 13, 2020

(54) COST-EFFECTIVE DEPLOYMENTS OF A PMEM-BASED DMO SYSTEM

(71) Applicant: MemVerge, Inc, San Jose, CA (US)

(72) Inventors: Yue Zhao, Shanghai (CN); Wei Kang, Beijing (CN); Yue Li, Fremont, CA (US); Jie Yu, Shanghai (CN)

(*) Notice: Subject to any disclaimer, the term of this patent is extended or adjusted under 35 U.S.C. 154(b) by 0 days.

(21) Appl. No.: 16/372,235

(22) Filed: Apr. 1, 2019

(65) Prior Publication Data

US 2020/0042184 A1 Feb. 6, 2020

Related U.S. Application Data

(63) Continuation-in-part of application No. 16/255,414, filed on Jan. 23, 2019.

(Continued)

(51) Int. Cl.
| | |
|---|---|
| *G06F 3/06* | (2006.01) |
| *G06F 12/084* | (2016.01) |
| *G06F 12/02* | (2006.01) |
| *G06F 15/173* | (2006.01) |
| *G06F 9/50* | (2006.01) |

(52) U.S. Cl.
CPC ............ *G06F 3/065* (2013.01); *G06F 3/0607* (2013.01); *G06F 3/067* (2013.01); *G06F 3/0643* (2013.01); *G06F 9/5016* (2013.01); *G06F 9/5077* (2013.01); *G06F 12/0238* (2013.01); *G06F 12/084* (2013.01); *G06F 15/17331* (2013.01); *G06F 2212/1004* (2013.01);

(Continued)

(58) Field of Classification Search
CPC ............ G06F 15/17331; G06F 2212/202–205
See application file for complete search history.

(56) References Cited

U.S. PATENT DOCUMENTS

| | | | |
|---|---|---|---|
| 2002/0103815 A1* | 8/2002 | Duvillier | G06F 16/2329 |
| 2013/0173853 A1* | 7/2013 | Ungureanu | G06F 12/124 |
| | | | 711/103 |

(Continued)

OTHER PUBLICATIONS

Sundararaman et al. "Towards Software Defined Persistent Memory: Rethinking Software Support for Heterogenous Memory Architectures." Oct. 2015. ACM. INFLOW'15.*

(Continued)

*Primary Examiner* — Nathan Sadler

(57) ABSTRACT

Disclosed herein is a persistent memory (PMEM)-based distributed memory object system, referred to as the PMEM DMO system, that provides affordable means of integrating low-latency PMEM spaces with other devices, including servers that do not directly support PMEM. One embodiment comprises providing a cluster of servers with PMEM storage (PMEM servers) and connecting the PMEM servers to a plurality of applications servers using a low-latency network, such as a remote direct memory access; background processes on each of the application servers are tasked to perform input/output operations for the application servers to locally materialize objects from and synchronize/persist objects to the remote PMEM spaces on the PMEM servers. Data materialized from the PMEM servers is stored to the local cache of the application server for use. Also disclosed are data eviction policies for clearing the local cache of the application servers to make space for new data read.

31 Claims, 8 Drawing Sheets

Related U.S. Application Data

(60) Provisional application No. 62/713,537, filed on Aug. 2, 2018.

(52) U.S. Cl.
CPC .. *G06F 2212/154* (2013.01); *G06F 2212/206* (2013.01); *G06F 2212/2024* (2013.01); *G06F 2212/254* (2013.01)

(56) References Cited

U.S. PATENT DOCUMENTS

| | | | |
|---|---|---|---|
| 2016/0117254 A1* | 4/2016 | Susarla | G06F 12/0897 711/119 |
| 2016/0342341 A1* | 11/2016 | Voigt | G06F 9/5016 |
| 2016/0342542 A1* | 11/2016 | Voigt | G06F 3/0659 |
| 2017/0177222 A1* | 6/2017 | Singh | G06F 9/45558 |
| 2018/0074971 A1* | 3/2018 | Maxey | G06F 12/1045 |
| 2018/0322058 A1* | 11/2018 | Tourrilhes | G06F 12/0815 |
| 2018/0343131 A1* | 11/2018 | George | G06F 3/0635 |
| 2019/0102287 A1* | 4/2019 | Cayton | G06F 3/0656 |

OTHER PUBLICATIONS

Malinowski et al. "A Parallel MPI I/O Solution Supported by Byte-addressable Non-volatile RAM Distributed Cache." 2016. PTI. Position Papers of the Federated Conference on Computer Science and Information Systems. vol. 9. pp. 133-140.*

Shan et al. "Distributed Shared Persistent Memory." Sep. 2017. ACM. SoCC '17. pp. 323-337.*

Ma et al. "An Efficient Framework for Implementing Persist Data Structures on Remote NVM." Sep. 2018. arXiv. https://arxiv.org/abs/1809.09395v1.*

Tsai et al. "Building Atomic, Crash-Consistent Data Stores with Disaggregated Persistent Memory." Jan. 2019. arXiv. https://arxiv.org/abs/1901.01628v1.*

* cited by examiner

COST-EFFECTIVE DEPLOYMENTS OF A PMEM-BASED DMO SYSTEM

CROSS-REFERENCE TO RELATED APPLICATION(S)

This application claims the benefit of and priority to U.S. Provisional Patent Application Ser. No. 62/713,537, filed on Aug. 2, 2018, for "Distributed Memory Object Architecture that Enables Memory-Speed Data Access for both Memory Semantics and Storage Semantics in a Distributed Environment", the entire disclosure of which are incorporated herein by references.

TECHNICAL FIELD

The present disclosure relates generally to distributed computer storage, and more particularly, to a distributed memory object architecture with partial implementation on legacy systems.

BACKGROUND

The computer industry continues to develop and refine solid-state storage devices and media, moving closer and closer to achieving memory-class storage. In the past decade there has been a thousand-fold reduction in access latency of affordable storage devices, and another twenty-fold reduction is expected within the year. At the same time, networking speeds have seen more than a 100-time increase in bandwidth with commensurate latency decrease, plus the emergence of standardized remote direct memory access (RDMA) functionality that can improve communication efficiency and further reduce latency.

These faster computing infrastructures demand new data infrastructures where both memory-speed data access and disk-like high storage density are strongly desired at the same time. Such new data infrastructures promise to bring significant performance improvements to computing tasks whose working data sets exceed dynamic random access memory (DRAM) capacity, and where highly frequent data movements between DRAM and lower storage tiers, such as solid state drive (SSD) and hard disk drive (HDD), are therefore required.

To provide the lowest possible access latency, operating system support of emerging persistent memory (PMEM) technology has created mechanisms for a user-space application to have direct access (DAX) to persistent memory media (i.e., without the access being performed by operating system software). Examples of existing solutions include:

"NOVA", which is a single-node file system for persistent memory with emphasis on consistency. It uses per-file metadata journals for fast, concurrent, consistent updates. NOVA also supports DAX memory mapped access. It, however, does not provide cross-node replication or availability.

"Strata", which is a single-node file system that provides a tiered, log-structured file system starting from a persistent memory layer and progressing to SSD then HDD as the data access frequency cools. It, however, does not support DAX memory map access, nor provide cross-node replication or availability.

"Octopus", which is a multi-node distributed persistent memory file system using tightly integrated RDMA to reduce communication latency. It, however, does not support DAX memory mapped access.

"Hotpot", which is a multi-node kernel-level distributed shared persistent memory system that provides low latency, transparent memory accesses, data persistence, data reliability, and high availability. It is focused on memory mapped access and does not address standard file storage IO operations.

"FluidMem", which is a multi-node system that realizes disaggregated memory in the datacenter. It does not address memory persistence or storage IO.

None of these existing solutions, however, provide low-latency access of multi-node distributed data objects with both the semantics of memory and the semantics of file storage. It is therefore desirable to provide low-latency memory spaces: 1) that are accessible across a cluster of nodes, 2) that can exceed the memory capacity of a given node in the cluster, and 3) that can span the memory and storage of multiple nodes. It is further desirable that these memory spaces be accessible with either the load/store semantics of memory, or with the read/write, input/output semantics of file storage.

Furthermore, none of these existing solutions allow legacy devices that do not support the new media of PMEM (such as 3D XPoint) a way of low-latency access to PMEM storage devices. The large-scale deployment of PMEM storage devices are very costly, typically costing more than ten times as much as comparable SSD devices. To replace all of the legacy servers in a server system with PMEM-compatible servers could be both wasteful and prohibitively costly.

Therefore, what is needed is a PMEM-based distributed memory object (DMO) system that can provide low-latency memory spaces and affordably integrate the PMEM-based DMO system with legacy devices that do not support PMEM technology.

SUMMARY

Disclosed herein is a persistent memory (PMEM) based distributed memory object system, referred to as the PMEM DMO system. In one embodiment, a persistent memory (PMEM) based distributed memory object (DMO) method, the method comprises creating a PMEM server cluster comprising a plurality of PMEM servers, wherein each PMEM server includes a distributed memory object (DMO) server, a persistent memory, a processor, and a network interface to send and receive messages and data; creating an application server cluster comprising a plurality of application servers, wherein each application server includes a client application, a local cache, a network interface to send and receive messages and data, and a DMO agent to interface with one or more DMO servers in the PMEM server cluster; connecting the network interface of one or more of the plurality of PMEM servers and the network interface of one or more of the plurality application servers to enable transfer of data between the PMEM servers and the application servers, wherein a client application can write data directly to a remote PMEM server by invoking the DMO agent to communicate with a DMO server on one or more of the PMEM servers and then using an offload write function to write the data directly on the PMEM server.

Another embodiment includes a method comprising creating a PMEM server cluster comprising a plurality of PMEM servers, wherein each PMEM server includes a distributed memory object (DMO) server, a persistent memory, a processor, and a network interface to send and receive messages and data; creating an application server cluster comprising a plurality of application servers, wherein each application server includes a client application, a local cache, a network interface to send and receive messages and data, and a DMO agent to interface with one or more DMO servers in the PMEM server cluster; connecting the network interface of one or more of the plurality of PMEM servers and the network interface of one or more of the plurality application servers to enable transfer of data between the PMEM servers and the application servers, wherein when a client application requests a read of an object, the DMO agent further comprising checking if the data exists in the local cache, and if so, the client application reading the data from the local cache, and if the data does not reside in the local cache, the DMO agent further comprising identifying the data chunks containing the requested data and pulling the data chunks from a remote PMEM server and returning requested data to the client application.

In one embodiment, a PMEM-based distributed memory object system comprises a PMEM server cluster comprising a plurality of PMEM servers, wherein each PMEM server includes a distributed memory object (DMO) server, a persistent memory, a processor, and a network interface to send and receive messages and data; an application server cluster comprising a plurality of application servers, wherein each application server includes a client application, a local cache, a network interface to send and receive messages and data, and a DMO agent to interface with one or more DMO servers in the PMEM server cluster; and a high speed data network to connect the network interface of one or more of the plurality of PMEM servers and the network interface of one or more of the plurality application servers to enable transfer of data between the PMEM servers and the application servers, wherein a client application can write data directly to a remote PMEM server by invoking the DMO agent to communicate with a DMO server on one or more of the PMEM servers and then using an offload write function to write the data directly on the PMEM server.

In another embodiment, a persistent memory (PMEM) based distributed memory object (DMO) system comprises a PMEM server cluster comprising a plurality of PMEM servers, wherein each PMEM server includes a distributed memory object (DMO) server, a persistent memory, a processor, and a network interface to send and receive messages and data; an application server cluster comprising a plurality of application servers, wherein each application server includes a client application, a local cache, a network interface to send and receive messages and data, and a DMO agent to interface with one or more DMO servers in the PMEM server cluster; and a high speed data network to connect the network interface of one or more of the plurality of PMEM servers and the network interface of one or more of the plurality application servers to enable transfer of data between the PMEM servers and the application servers, wherein when a client application requests a read of an object, the DMO agent is configured to check if the data exists in the local cache, and if so, the client application reads the data from the local cache, and if the data does not reside in the local cache, the DMO agent identifies the data chunks containing the requested data and pulls the data chunks from a remote PMEM server and returns the requested data to the client application.

In another embodiment, a persistent memory-based distributed memory object method comprises running one or more DMO services which run in a PMEM server cluster, wherein the PMEM server cluster comprises one or more PMEM servers each having a persistent memory; running one or more DMO agents which run in an application server cluster, wherein the application server cluster comprises one or more application servers; configuring the DMO agents to interface between one or more client applications installed on the application servers and the DMO services via a low-latency network, manage cached memory on the application servers, and output data to the client applications; and configuring the DMO services to receive data service requests from the DMO agents, coordinate data storage to the persistent memory of one or more PMEM servers, and provide persistent memory-based data services to the application servers via the low-latency network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

As used in the following description, remote direct memory access (RDMA) refers to a direct memory access mechanism that enables a computer to access the memory of another computer without involving the operating system of either computer. Persistent memory (PMEM) refers to the storage of data structures such that the data can continue to be accessed using memory instructions, e.g., load and store, even after completion of the process that created or modified the data structures.

Overview of the PMEM DMO System

Figure 1:
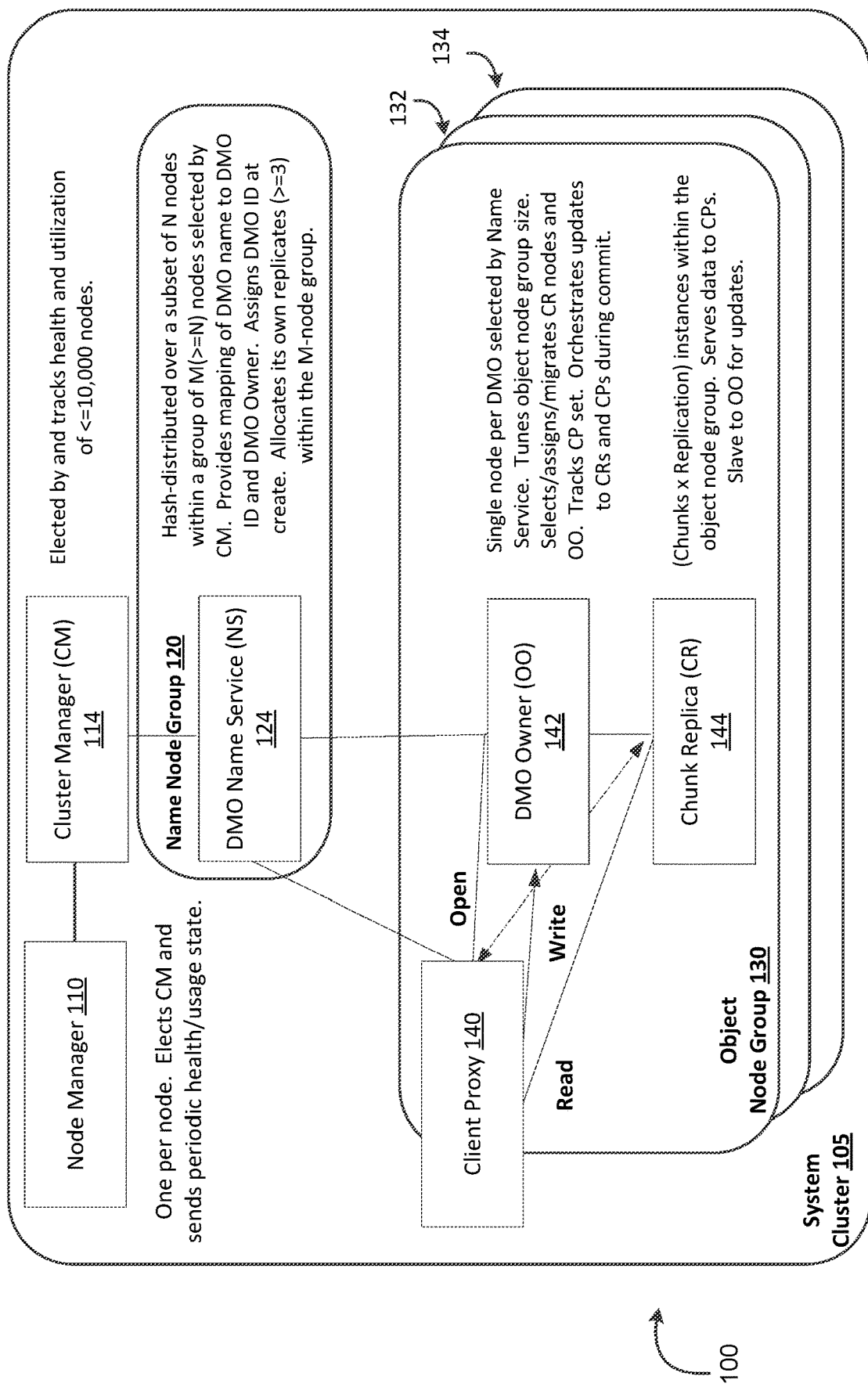
FIG. 1 is an illustration of a PMEM DMO system that includes an object node group that implements a distributed memory object (DMO) system.
Figure 2:
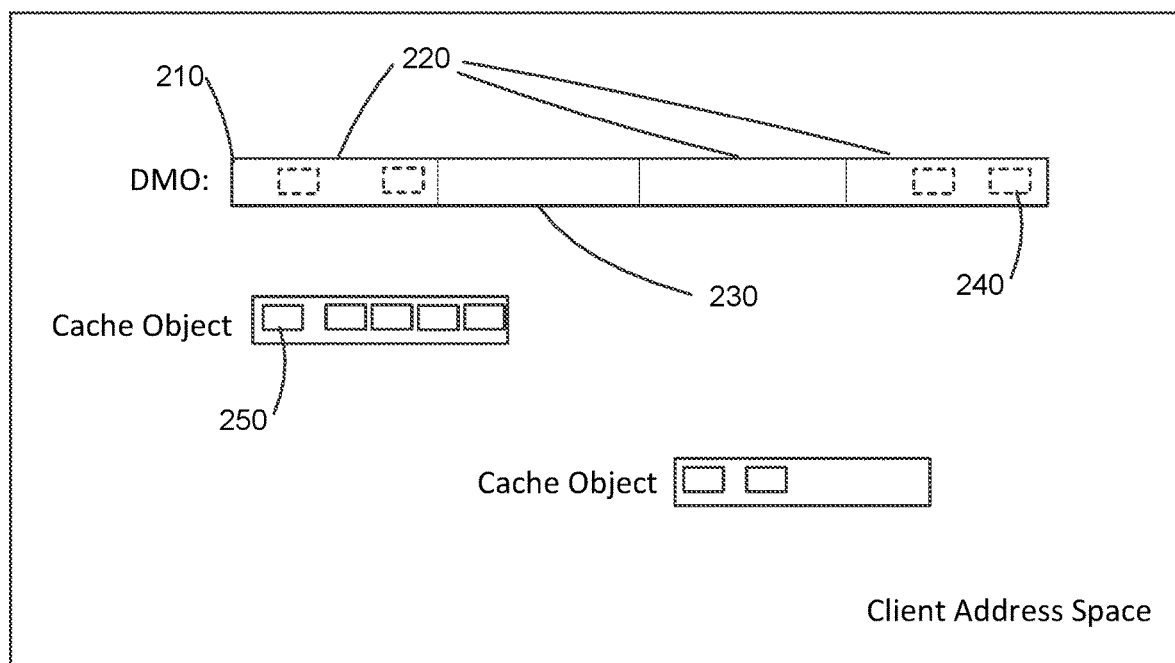
FIG. 2 is an illustration of a DMO in a client address space.

FIG. 1 is an illustration of a PMEM DMO system 100 that distributed memory objects (DMOs) can be accessed as either in-memory mode or file-storage mode. In the PMEM DMO system 100, a system cluster 105 is formed by a number of nodes. Each node includes a memory, a processor and a network interface through which it may send and receive messages and data. FIGS. 1 and 2 provide an overview of the PMEM DMO system's theory of operation, while FIGS. 3 through 8 describe embodiments of implementation of the PMEM DMO system 100 with application servers (i.e., clients) to materialize data from or synchronize/persist data to a remote persistent memory space on the PMEM DMO system.

With continued reference to FIG. 1, a PMEM DMO system 100 provides for the creation of sharable memory spaces, each space being a DMO with a single owner node. These owner nodes are referred to herein as object owner (OO) nodes 142. The address space for a DMO may be partitioned into equal-sized chunks, with each chunk being stored on one or more chunk replica (CR) nodes 144 included in the cluster of nodes.

Any node in the cluster using a DMO may locally keep a copy of any page. A node that uses a DMO is referred to as a client proxy (CP) node 140. The object owner node 142 is responsible for coordinating updates to the client proxy node (or nodes) 140 as well as the chunk replica nodes 144. The object owner node 142 and client proxy nodes 144 can migrate to deal with failures, performance, or resource constraints. Client proxy nodes 140 and chunk replica nodes 144 cooperate with the object owner node 142 in implementing protocols to make coherent updates and thereby providing a crash-consistent view in the face of failures.

Continuing with FIG. 1, a system cluster within which a PMEM DMO system 100 may be implemented includes an object node group 130 and various other nodes. The following functional components are associated with one or more nodes in the system cluster:

Node Manager (NM)

The node manager (NM) 110 operates on each node in the PMEM DMO system 100. Once a node manager 110 starts on a node, it can start or stop all other services associated with the node. Some services associated with a node may be started or stopped automatically or by request. The node manager 110 is responsible for finding or electing the cluster manager (CM) 114 and notifying its existence and node health to the cluster manager 114. Hence the node manager 110 has access to performance and exception information from other components in the system 100.

Cluster Manager (CM)

The cluster manager 114 runs on a single node in the PMEM DMO system 100. The single node on which the cluster manager 114 runs is elected by a consensus algorithm of the node managers 110. The cluster manager 114 mediates cluster membership, node ID assignment, and the name service (NS) group 120. The cluster manager 114 also chooses nodes to satisfy allocation request constraints against cluster resource loading.

DMO Name Service (NS)

The DMO name service (NS) 124 is a hash-distributed service which provides mapping of a DMO name string to its object ID and the object owner. The service is hash distributed across a set of nodes in the system cluster 105.

Object Owner (OO)

The DMO object owner 142 is a single-node service that manages a DMO. The node corresponding to the client proxy 140 that creates the DMO becomes the object owner node 142. The object owner 142 is responsible for selecting (via a cluster manager 114) an initial object node group 130 to contain the DMO and for assigning the chunk replicas (CRs) 144 within that object node group 130. Some embodiments may contain additional object node groups 132, 134, etc. The object owner 142 also manages growing, shrinking, migrating, and recovering both the node group 130 as a whole, and the chunk replica 144 assignments within that group, as required to meet the DMO's size and replication requirement, or to optimize its usage efficiency. The object owner 142 can choose to move to another node (e.g., to be on the same node as a write client proxy). If the object owner 142 node fails, the DMO's node group will re-elect an object owner. The object owner keeps track of client proxies and orchestrates all updates affecting the DMO, e.g., configuration changes as well as data writes (msync commits and/or write 10).

Chunk Replica

The chunk replica 144 is a slave entity to the object owner 142 and client proxy 140. The object owner and client proxy read from and write to the chunk replica 144. The chunk replica owns some amount of storage devices (PMEM, SSD, etc.) on its node and manages the details of how/where a chunk of address space is stored therein.

Client Proxy (CP)

The client proxy 140 performs all input/output operations for the client and locally materializes and synchronizes/persists any object that the client requests to be memory mapped. To do that materialization, the client proxy 140 creates a local cache for pieces of remote chunks that are in use and manages selection and eviction of pieces that are unused (or less actively used) as capacity constraints require. The client proxy 140 has code to specifically handle page fault notifications sent to it by the userfaultfd feature of Linux, or similar page fault notifications in other operating environments.

Example Operation Flows

FIG. 2 is an illustration of a DMO in a client address space. When a client proxy opens a DMO, the client proxy 140 allocates a logical address region 210 or space for that DMO and registers the region to monitor for page faults. The client proxy 140 then direct maps for any local chunks 230 at their appropriate offset within the logical address region. Next, the client proxy 140 acquires a remote direct memory access (RDMA) access descriptor to an instance of each remote chunk. The client proxy 140 then creates and maps one or more PMEM files to use as a cache 250. Now when the application accesses a region of that DMO space that is not direct mapped, a page fault is signaled and the client proxy's page fault handler will allocate an area of the cache file, fill the cache file via an RDMA read of the appropriate remote chunk area 220, and then map that area of the cache file into its appropriate offset of the DMO region, thus completing the handling of the page fault.

Note that management of the cache capacity may require that a previously allocated area of cache be removed from its current role in the DMO address space (i.e., evicted) in order to reassign it for a new role. This eviction process can typically happen as a background task where an eviction candidate is selected, unmapped from the DMO space, and written back via an RDMA write to its remote location if required. The cache area of that candidate is then freed for reallocation.

With continued reference to FIG. 2 and additional reference to FIG. 1, a client application installed in a client node or local node, which may be any node in the system cluster of FIG. 1, opens a DMO name. For example, the client application may "call" a library that is included in the client application and may "call" a client proxy 140. The library is configured to map an anonymous memory region equal to the size of the DMO, to register that memory region for user page faults, to over map 240 the local chunk files on that memory region, and to remember the cache file for later use. The client proxy 140 is configured to call the name service 124 to get the object owner 142, call the object owner 142 to get table of chunk nodes, to open "local chunk" files that are on the local node, to open an empty "cache file" or "cache object" on the local node, and to reply to the library in the local node with file information including: a file descriptor for the local chunk files on the local node and a file descriptor for the cache file/object. The file descriptor for the local chunks may include an offset within the logical address space for the DMO and a size for the local chunk.

The client application starts using the DMO, i.e., it can do load/store references to the DMO, and/or read/write input/output calls to/from the DMO. If a load/store reference from the client application accesses a DMO region that is not over mapped, the client application takes/receives a page fault. The library gets a page fault notification and calls to the client proxy 140. The client proxy 140 caches the needed region into the cache file and replies to the library. The library then can over map the new region onto an appropriate local DMO space.

Thus, from a client application perspective, a PMEM DMO system 100 enables a user, via the client application in conjunction with a client proxy 140, to initiate the use of a DMO, have data placed in one or more memory regions mapped to the DMO by either of a store call or a write call, and access data stored in one or more memory regions mapped to the DMO by a load call or a read call.

Implementation of the PMEM DMO System

Figure 3:
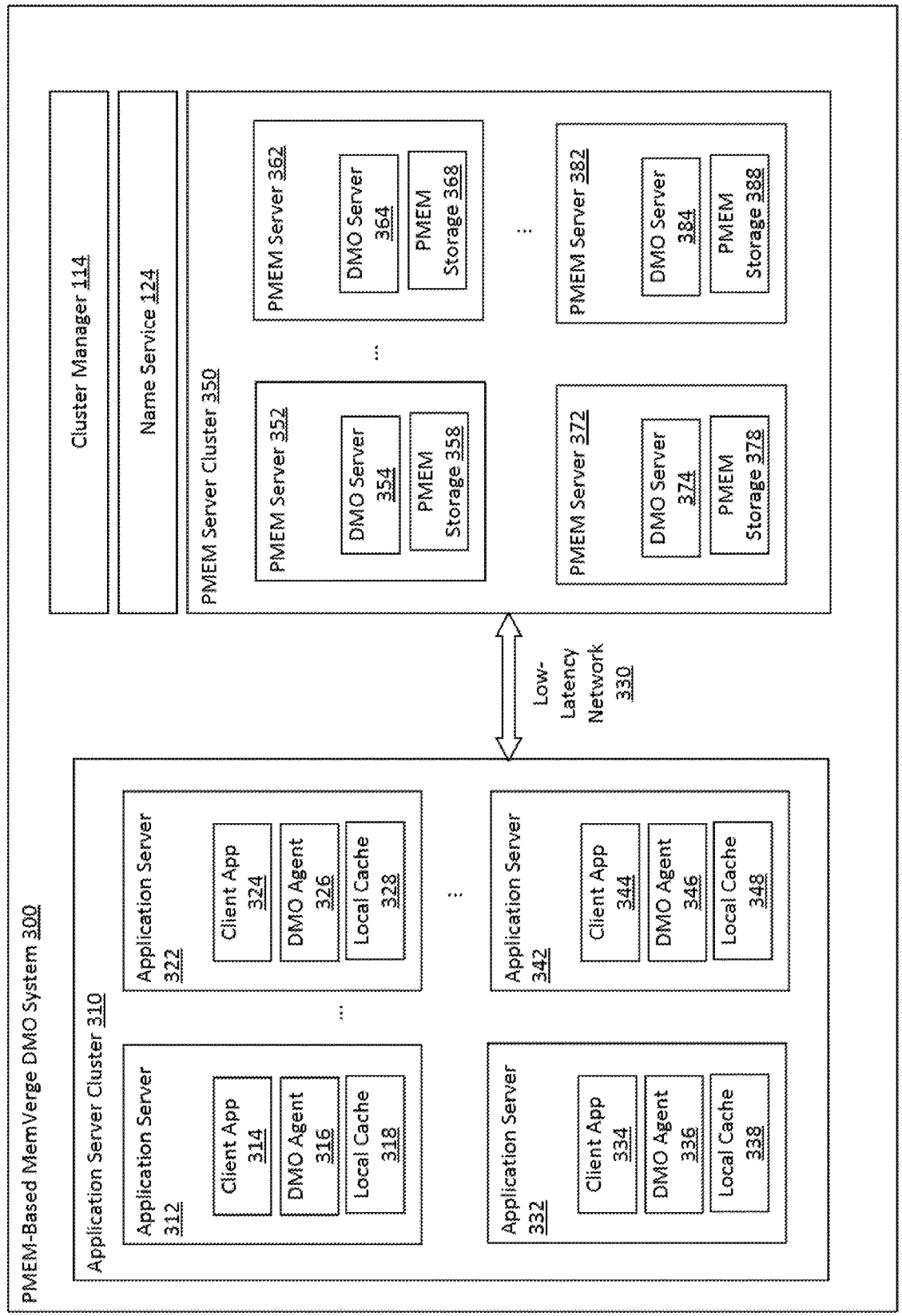
FIG. 3 is an illustration of a PMEM DMO system that is implemented with a cluster of application servers (i.e., clients).

FIG. 3 is an illustration of one embodiment PMEM DMO system 300 that is implemented partially on a cluster of application servers. In some embodiments, the applications servers have resident PMEM, while in other embodiments legacy application servers will not have PMEM. The first illustrated embodiment includes one or more application servers 312, 322, 332 and 342 creating an application server cluster 310, wherein each application server has a corresponding client application 314, 324, 334, 344, with each client application having an associated DMO agent 316, 326, 336 and 346 and local cache 318, 328, 338 and 348, respectively. In the embodiment illustrated in FIG. 3, the application server cluster is comprised of legacy servers without installed PMEM.

PMEM DMO system 300 in FIG. 3 also includes a group of PMEM servers 352, 362, 372 and 382 in a PMEM server cluster 350 which is in communication with application server cluster 310 over a high-speed network 330 such as RDMA, DPDK, RoCE, RDMA iWARP, and other equivalent high-speed networks. PMEM servers include PMEM data storage 358, 368, 378 and 388 and DMO Server 354, 364, 374 and 384, respectively.

With reference to the embodiment PMEM DMO system 100 illustrated in FIG. 1, the application servers 312, 322, 332, and 342 can represent the client on which the client proxy node 140 and the object owner node 142 are located, whereas the PMEM servers 122 can represent the physical embodiment of the chunk replica nodes 144. The application server 312 hosting an object owner node 142 and the client proxy node 140 and the group of PMEM servers on which the object is stored, form an object node group 130. Since each PMEM server may store chunks of objects, each PMEM server may simultaneous be a member of multiple object node groups 130. Furthermore, the membership of an object node group may be dynamically redrawn by the object owner node 142 and the client proxy 140. Therefore, a PMEM server may be part of multiple object node groups 130 and the object node groups 130 may change during operation.

At the software level, the application servers have installed one or more client applications that call the objects; and a DMO agent to function as the object node owner 142 and the client proxy 140 in carrying out the input/output operations for the application server 312 and locally materializes and synchronizes/persists data that the application server 312 has requested to be memory mapped. In this embodiment, PMEM servers each have installed a background process, referred to as a DMO server 324, which functions as the node manager 110 for that PMEM server 352 and is tasked with finding and electing their respective cluster manager 114 and notifying their respective node's existence and health to the cluster manager 114. Lastly, in this system 300, the name service 124 may be hash-distributed over any number of PMEM servers.

Turning to the low-latency network 330, which enables the receiving and sending of data between the application servers and the PMEM servers, one embodiment of the network uses a form of remote direct memory access (RDMA), such as RDMA over converged ethernet (RoCE) or internet wide-area RDMA protocol (iWARP) to reduce access latency. By leveraging RDMA's "offload write" functionality, the user can avoid extra request/response communication overhead between the application server and the PMEM server, as well as avoid consuming CPU resources on the PMEM server. Other embodiments are not restricted to RDMA, but may use other suitable high-speed network infrastructures.

Figure 4:
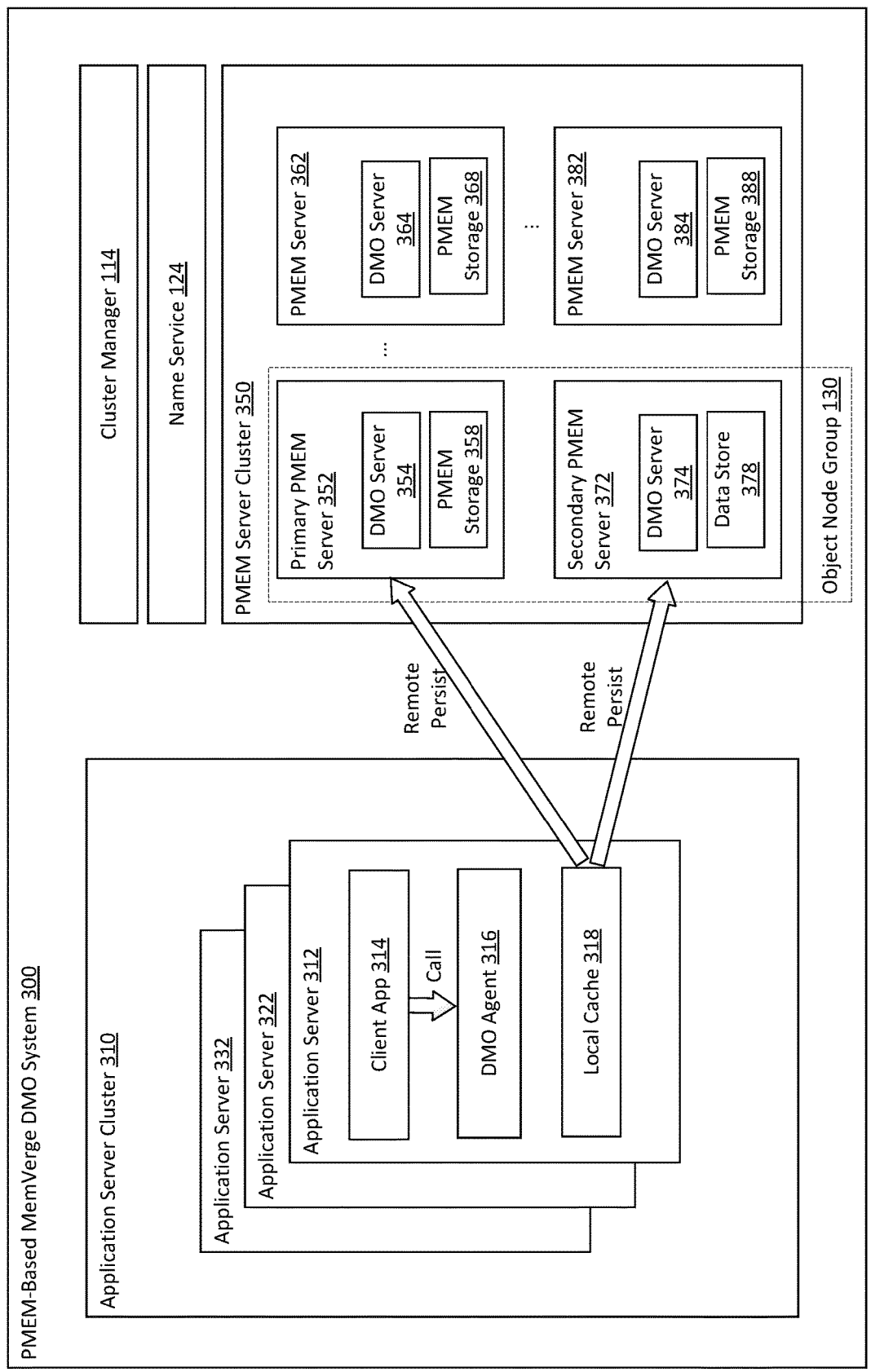
FIG. 4 is an illustration of an application server persisting/synchronizing data to the PMEM server nodes.

FIG. 4 is an illustration of one embodiment of an application server 312 synchronizing data to one or more of the PMEM servers. When client application 314 on application server 312 requests data to be written to PMEM servers 352, as an example, the client application 314 calls the DMO agent 316 and the DMO agent 316 then calls the name service 124 to obtain a table of the requested chunks. Then the DMO agent 316 calls the object owner 142.

Next, the application server 312 opens local chunk files that are on the application server 312 and then opens an empty "cache file" or "cache object" on the application server 312. Then the application server 312 replies to the DMO agent 316 with file information including a file descriptor for the local chunk files on the application server 312 and a file descriptor for the cache file/object. Then the DMO agent 316 maps a memory region equal to the size of the written data, registers the memory region for user page faults, over maps the local chunk files on that memory region and optionally stores the cache file for later use.

Depending on the configured replication factor for the DMO, chunks may be replicated to one or more PMEM servers 352, 362, 372 and 382 (i.e., the chunk replica nodes 144). Depending on the configuration of the particular system, the replication process may be synchronous or asynchronous. In synchronous replication, a given data chunk is persisted to all of its replica target PMEM servers in an object node group 130 simultaneously. In asynchronous replication, however, the data is first stored to one PMEM server before it is replicated to other PMEM servers.

By replicating the data to multiple PMEM servers (and possibly at different physical sites), the PMEM DMO system also provides redundancy protection against disasters, allow faster parallel transfer of data across multiple pathways, and allows load balance for reads from multiple write data using synchronous and asynchronous replication method.

In another embodiment, a DMO system includes a PMEM server cluster 320 includes a plurality of PMEM servers 352, 362, 372 and 382, wherein each PMEM server includes a distributed memory object (DMO) server 354, 364, 374 and

384, a persistent memory 358, 368, 378 and 388, a processor, and a network interface to send and receive messages and data. The DMO system further includes an application server cluster comprising a plurality of application servers, wherein each application server includes a client application, a local cache, a network interface to send and receive messages and data, and a DMO agent to interface with one or more DMO servers in the PMEM server cluster.

Additionally, in the present embodiment the DMO system includes or utilizes a high speed data network to connect the network interface of one or more of the plurality of PMEM servers and the network interface of one or more of the plurality application servers to enable transfer of data between the PMEM servers and the application servers, wherein a client application can write data directly to a remote PMEM server by invoking the DMO agent to communicate with a DMO server on one or more of the PMEM servers and then using an offload write function to write the data directly on the PMEM server.

Figure 5:
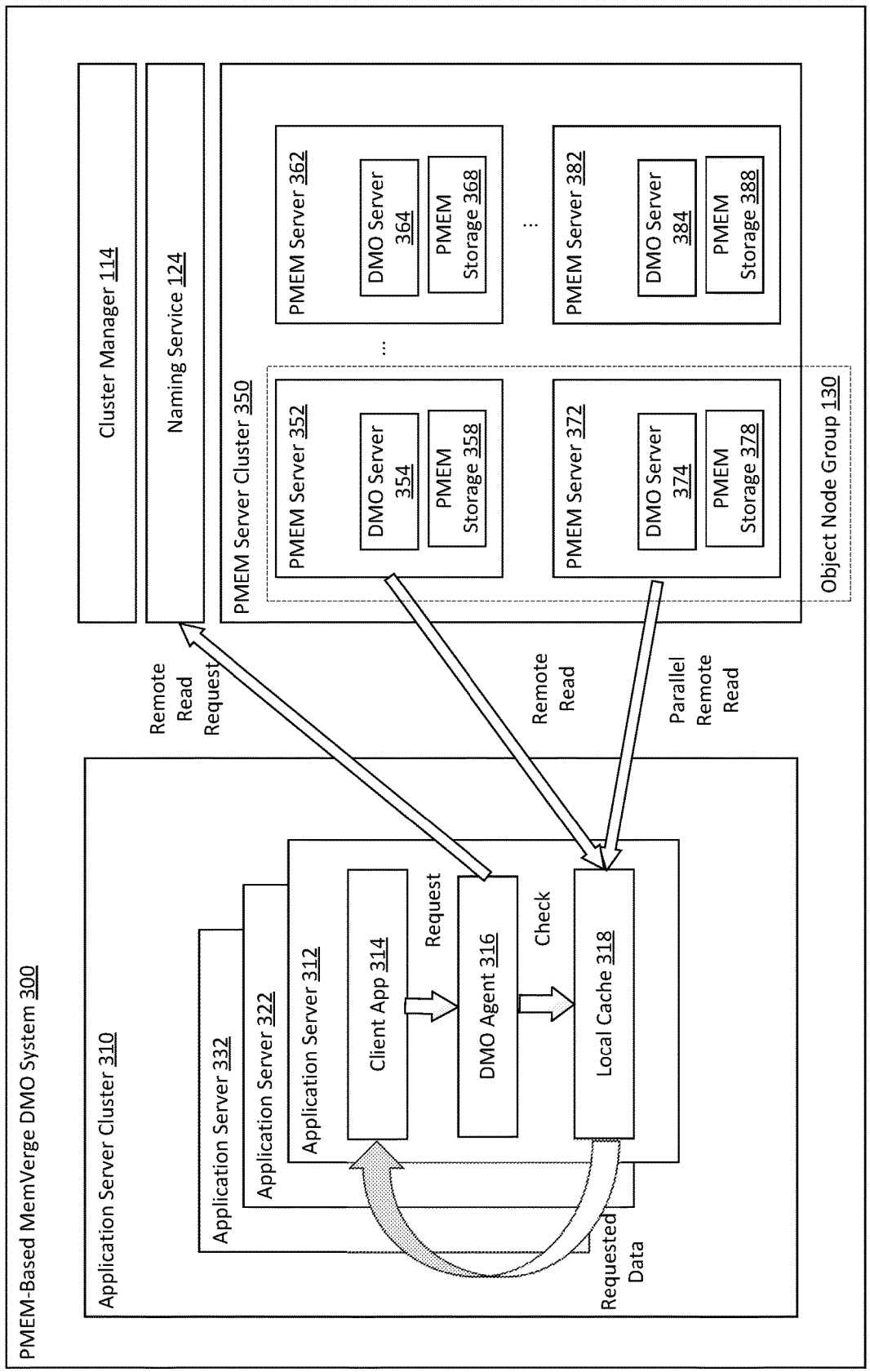
FIG. 5 is an illustration of an application reading data directly from the local cache of the application server or by first materializing the data from the PMEM storages to the local cache before reading.

FIG. 5 is an illustration of an embodiment application reading data from a local cache 318 or by retrieving the data from the PMEM servers. When a client application 314 requests data by providing the offset and size of the read, the DMO agent 316 first checks its local cache 318 for the requested data. If the requested data has already been mapped and exists within the application server 312, then the data can be accessed directly by the client application 314.

On the other hand, if the requested data is not found in the local cache 318, then the requested data is stored locally on the application server 312 before it is read. In this case, a page fault is signaled and the DMO agent's page fault handler will allocate an area of the local cache file and fill the cache file via the low-latency network with chunks from the appropriate area on the PMEM servers 352, etc. Once the requested data is in the local cache 318, the requested data can be accessed by client application 314.

While the requested data could be fetched from the PMEM servers 352 on an individual byte basis, which would only contain the requested data, this is an inefficient method. According to one embodiment, only complete chunks containing the requested data (as opposed to individual bytes containing the data) are copied from the PMEM storage 358 of the PMEM servers 352 to the local cache 318 of the application server 312. Fetching data at the chunk-level is more cost-efficient for space allocation and the network. Furthermore, if a new read needs data contained in the chunks that had already been copied to the local cache 318 from an earlier request, then the data requested by the new read can be returned directly from the local cache 318 to save on network overhead.

In another embodiment, a persistent memory (PMEM) based distributed memory object (DMO) system includes a PMEM server cluster 350 comprising a plurality of PMEM servers, wherein each PMEM server includes a distributed memory object (DMO) server, a persistent memory, a processor, and a network interface to send and receive messages and data, and an application server cluster 310 comprising a plurality of application servers, wherein each application server includes a client application, a local cache, a network interface to send and receive messages and data, and a DMO agent to interface with one or more DMO servers in the PMEM server cluster.

The present embodiment further includes or utilizes a high speed data network 330 to connect the network interface of one or more of the plurality of PMEM servers and the network interface of one or more of the plurality application servers to enable transfer of data between the PMEM servers and the application servers, wherein when a client application requests a read of an object, the DMO agent is configured to check if the data exists in the local cache, and if so, the client application reads the data from the local cache, and if the data does not reside in the local cache, the DMO agent identifies the data chunks containing the requested data and pulls the data chunks from a remote PMEM server and returns the requested data to the client application.

In one embodiment, a persistent memory-based distributed memory object method comprises running one or more DMO services which run in a PMEM server cluster 350, wherein the PMEM server cluster comprises one or more PMEM servers 352, 362, etc., each having a persistent memory 358, 368, etc., and running one or more DMO agents 316, 326, etc. which run in an application server cluster, wherein the application server cluster 310 comprises one or more application servers and configuring the DMO agents 316, to interface between one or more client applications 314 installed on the application servers and the DMO services via a low-latency network 330, to manage cached memory on the application servers, and output data to the client applications 314, etc., and configuring the DMO services to receive data service requests from the DMO agents, coordinate data storage to the persistent memory of one or more PMEM servers, and provide persistent memory-based data services to the application servers via the low-latency network.

The present embodiment may further include requesting the DMO agents 316, 326, etc., to store cached memory from the applications 314, etc., to the persistent memory of the PMEM servers 352, etc., and memory mapping location of data on the persistent memory of the PMEM servers 352, etc., and receiving request to store cached memory from the applications to the persistent memory of the PMEM servers, allocating memory on the persistent memory 358, etc., of the PMEM servers for storing data transferred from the application servers via the low-latency network 330 and storing data transferred from the application servers via the low-latency network to the persistent memory of the PMEM servers in 350. In some embodiments, the low-latency network may be a high-speed data network with greater than 1 GB/s throughput to each of the application servers.

This embodiment may further comprise storing one or more replicas of cached memory of the application servers to the persistent memory of the PMEM servers. Additionally, the replicas may be stored to one PMEM server at a time, to PMEM servers simultaneously, etc.

Additionally, in the present embodiment, the low-latency network may be a remote direct memory access-enabled network that enables the client application to directly write data to the persistent memory of the PMEM servers 352, etc. Furthermore, some embodiments may include requesting the DMO service to send requested data stored on the persistent memory of the PMEM servers to cached memory of the application servers 312, etc., and sending requested data stored on the persistent memory 358, etc., of the PMEM servers to cached memory of the application servers 318, etc., and mapping a cached memory location of the requested data and returning the requested data to the client applications. Some embodiments may further include sending requested data stored on the persistent memory of the PMEM servers 352 etc., to cached memory of the application servers 312, etc., in complete chunks that contain the requested data.

In yet another embodiment, a persistent memory-based distributed memory object system may comprise one or more DMO services which run in a PMEM server cluster 350, wherein the PMEM server cluster comprises one or more PMEM servers each having a persistent memory and include one or more DMO agents which run in an application server cluster. Further, the application server cluster 310 may comprises one or more application servers 312, 322, etc., with the DMO agents being configured to interface between one or more client applications 314, etc., installed on the application servers and the DMO services via a low-latency network 330, and to manage cached memory on the application servers, and output data to the client applications.

Additionally, in some embodiments the DMO services can be configured to receive data service requests from the DMO agents, coordinate data storage to the persistent memory of one or more PMEM servers, and provide persistent memory-based data services to the application servers via the low-latency network. In some embodiments, the low-latency network is a high-speed data network with greater than 1 GB/s throughput to each of the application servers. In some embodiments, the low-latency network may be a remote direct memory access-enabled network that enables the client application to directly write data to the persistent memory of the PMEM servers.

In some embodiments, the DMO services 354, etc., may be configured to receive data service requests from the DMO agents 316, etc., coordinate data storage to the persistent memory 358, etc., of one or more PMEM servers, and provide persistent memory-based data services to the application servers 312, etc., via the low-latency network 330 by allocating memory space in the persistent memory of the PMEM servers for storing data, memory mapping the location of data by using a hash-distributed naming service and storing data in the persistent memory of the PMEM servers via the low-latency network.

Additionally, data may be partitioned into a plurality of data chunks and stored in the persistent memory of the PMEM servers of the PMEM server cluster by storing each data chunk to the persistent memory of one or more PMEM servers of the PMEM server cluster one PMEM server at a time, simultaneously, etc. Further, some embodiments may include checking the application servers for requested data and if requested data does not exist in cached memory of the application servers, then identifying location of one or more data chunks that contain requested data on the persistent memory of the PMEM servers of the PMEM server cluster and copying the data chunks that contain requested data from the persistent memory of the PMEM servers to cached memory of the application servers via the low-latency network, and returning the data chunks containing requested data to the client applications.

In some embodiments, a cache eviction method for evicting cached data from a local cache of an application server comprise running a scheduled eviction loop which removes objects stored in the local cache that have been closed for a period longer than a first timeout threshold, running a cache-based on-demand eviction routine comprising, checking the local cache to determine whether the local cache has sufficient capacity to store incoming data, and if the local cache does not have sufficient capacity, then running an object-level eviction.

For example, the cache eviction method may include evicting objects stored in the local cache that have been closed for a period longer than a second timeout threshold, wherein the second timeout threshold is less than the first timeout threshold, and if the object-level eviction does not vacate sufficient capacity in the local cache to store incoming data, then running a chunk-eviction loop until sufficient capacity in the local cache is vacated to store incoming data, wherein the chunk-eviction loop comprises evicting chunk-level data fragments stored in the local cache based on a least recently used protocol, and checking the local cache to determine whether the local cache has sufficient capacity to store incoming data. In some embodiments, the second timeout threshold is zero minutes.

In this embodiment, the local cache may occupy a portion of a local persistent memory in the application server, and the on-demand eviction routine further comprise checking whether a used capacity of the local persistent memory has exceeded a memory threshold, and if the used capacity has exceeded the memory threshold, then running an object-level eviction, which comprises evicting objects stored in the local cache that have been closed for a period longer than a third timeout threshold, wherein the third timeout threshold is less than the first timeout threshold, and if the object-level eviction does not vacate sufficient capacity in the local cache to store incoming data then running a chunk-eviction loop until sufficient capacity in the local cache is vacated to store incoming data. Further, the chunk-eviction loop may comprise evicting chunk-level data fragments based on a least recently used protocol; and checking the local cache to determine whether the local cache has sufficient capacity to store incoming data.

Cache Capacity and Eviction Policy

Note that management of the cache capacity of an application server node may require that a previously allocated cache be removed (i.e., evicted) in order to reassign it for a new role. This eviction process can typically happen as a background task where an eviction candidate is selected, removed, and written back via the low-latency network to its remote location on the PMEM server if required. The local cache is then freed for reallocation. The parameters determining when eviction should take place and which eviction candidate should be evicted is configurable.

Figure 6:
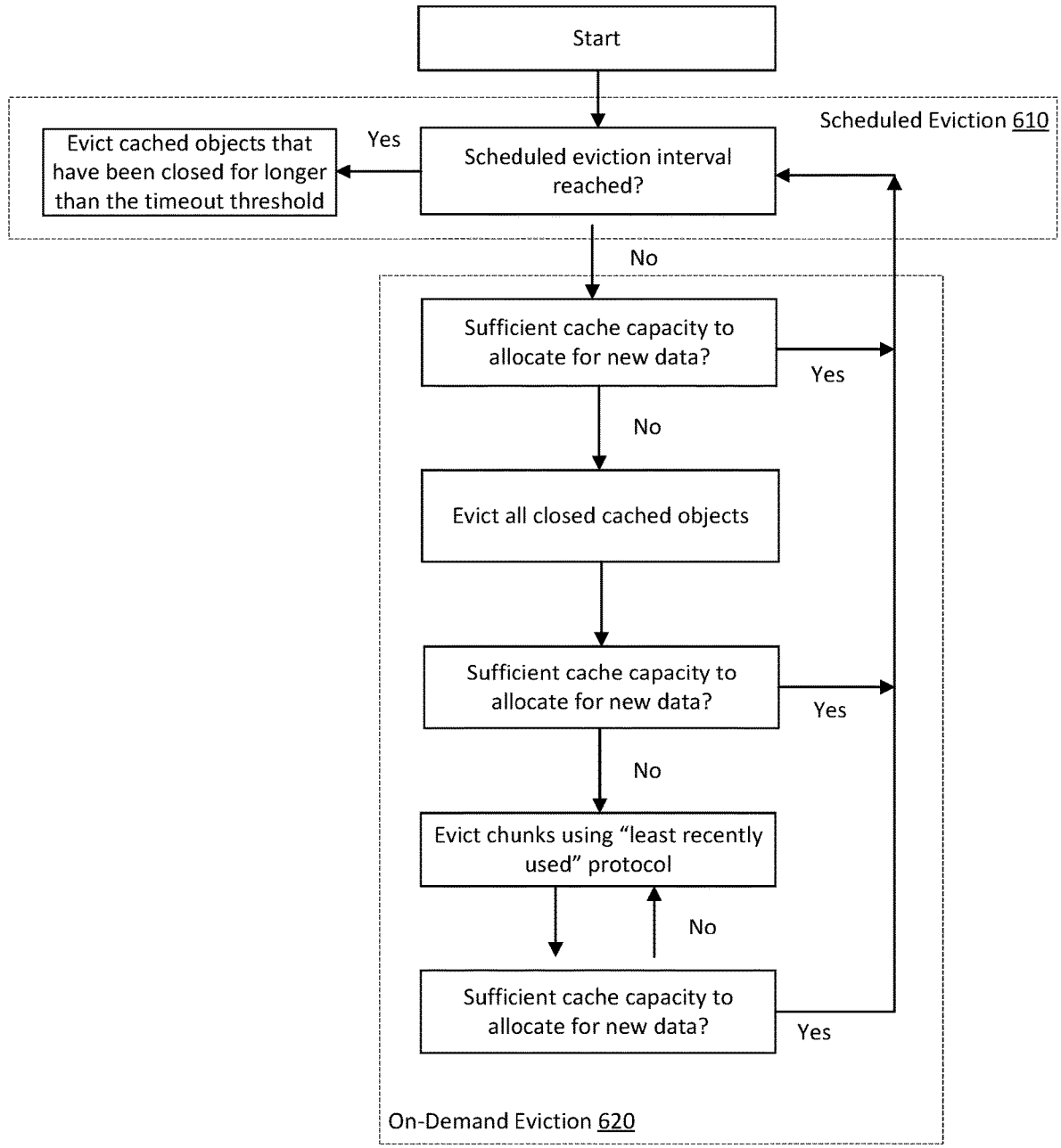
FIG. 6 is a flowchart of an eviction policy for removing data from the local cache of an application server.

FIG. 6 illustrates an example of a cache eviction policy configured to evict cached data based on two eviction processes. This eviction policy comprises two parallel eviction processes—scheduled eviction 610 and on-demand eviction 620. For the scheduled eviction process 610, the application server is configured to periodically run a scheduled task (e.g., every five minutes), which would evict all cached objects that have been closed for longer than a predefined timeout threshold (e.g., every five minutes also). At the same time, the parallel on-demand eviction process 620 would monitor the local cache for insufficient capacity to store new data and activate the on-demand eviction job if the capacity is insufficient, evict all closed objects from the local cache, and if the local cache still does not have sufficient capacity after the eviction of all closed objects, then evict cached chunks based on a "least-recently-used" ("LRU") protocol until sufficient space has been freed up to store the new data. Note, however, the foregoing eviction processes only represent an example of how to manage the cache capacity of an application server; the eviction policy can be customized based on the system's design as needed. For instance, if one or more application servers have locally installed PMEM storage, the eviction process may be modified accordingly. A system wherein the application servers have local PMEM storage and a modified eviction policy to accommodate this type of modification are described below.

Figure 7:
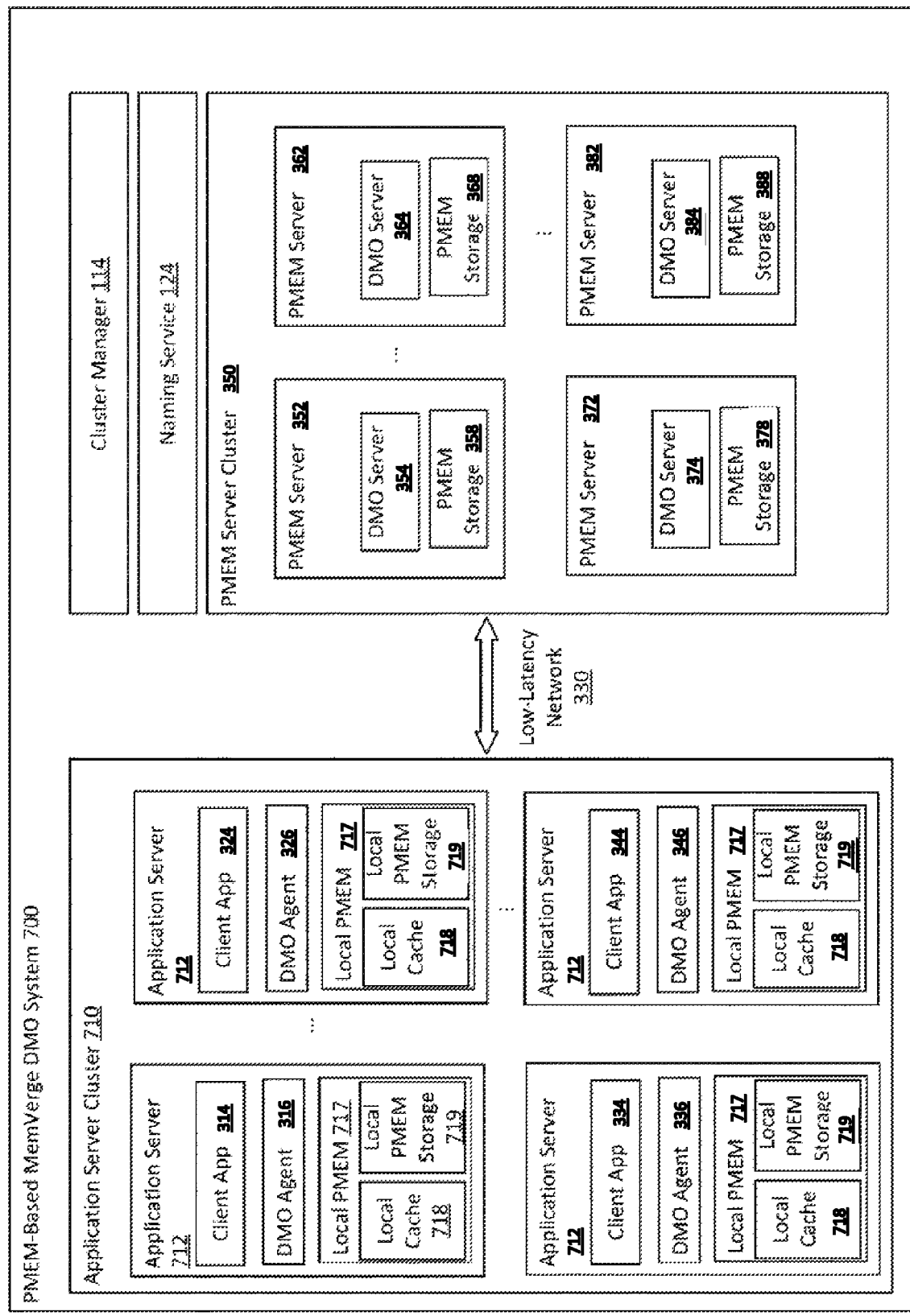
FIG. 7 is an illustration of a PMEM DMO system that is integrated with application servers that have installed local PMEM.

Implementation of the PMEM DMO System with Application Servers with Local PMEM Storage FIG. 7 is an illustration of a PMEM DMO system 700 that is integrated with application servers that have installed local PMEM. This modified system 700 differs from the system in FIG. 3 in that the locally installed PMEM 717 on the application server 712 allows the system to prioritize persisting data to the application servers' local PMEM storage 719 over remotely persisting the data to the PMEM storage 328 on the PMEM server 322. Persisting the data locally can further reduce the latency time as compared to remotely persisting the data to remote devices. According to an embodiment of this modified PMEM DMO system, a portion of the local PMEM 717 can be allocated to act as a local cache 718. As such, the local PMEM 717 will be used as the local PMEM storage 719 for locally persisted data as well as the local cache 718 for the application server 712. Furthermore, the system 700 may be configured to shift to persisting data on remote PMEM storage 758 if the consumed capacity of the local PMEM 717 exceeds a certain threshold.

Figure 8:
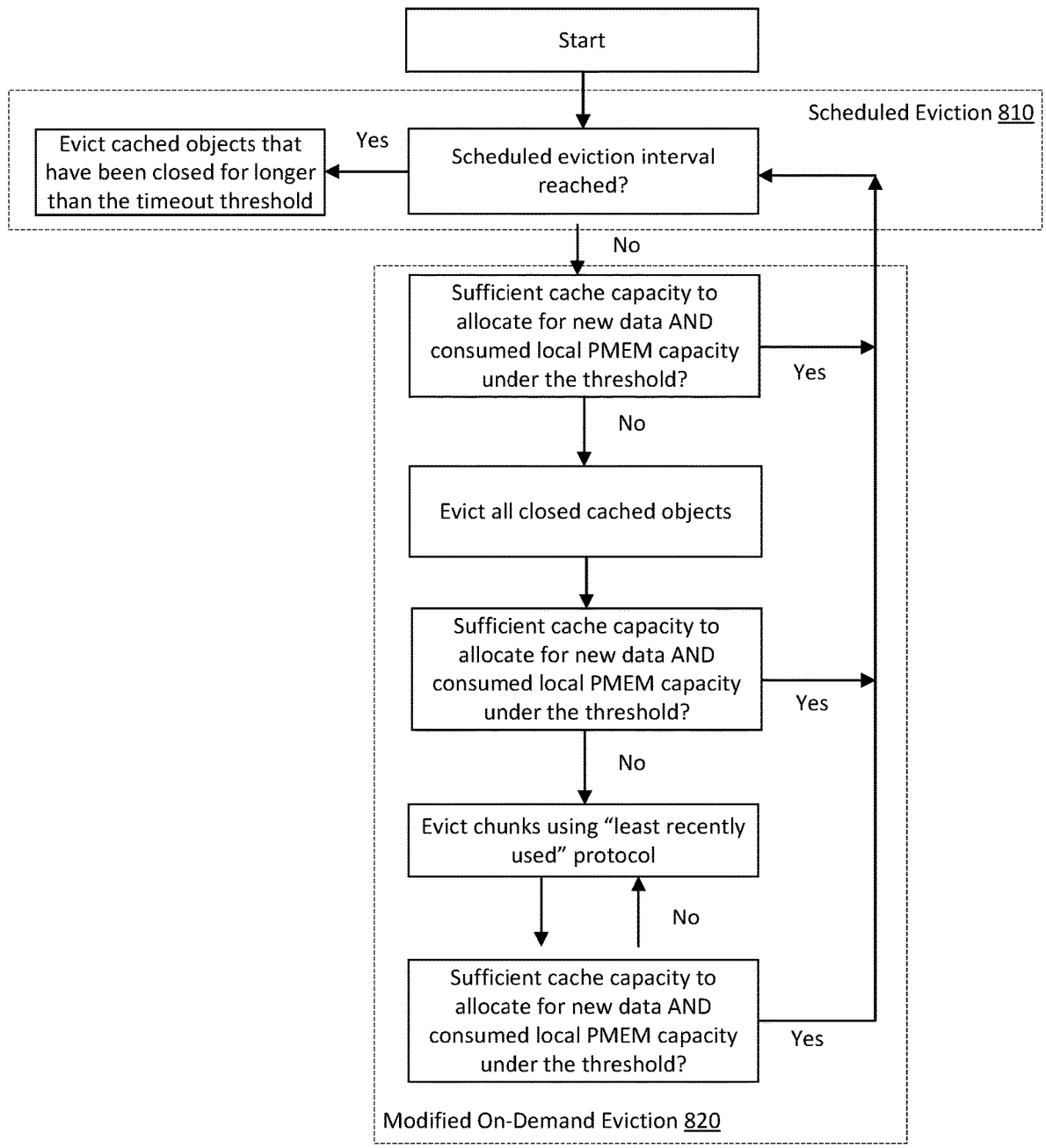
FIG. 8 is a flowchart of a modified eviction policy for removing data from the local cache of an application server that has local PMEM storage.

FIG. 8 is an illustration of a modified eviction policy for removing data from the local cache of the modified system 700 shown in FIG. 7. Here, the cache eviction policy is still configured to evict cached data based on two parallel eviction processes—scheduled eviction 810 and on-demand eviction 820. The scheduled eviction process 810 remains the same, the application server is configured to periodically run a scheduled task (for example, every five minutes), which evicts all cached objects that have been closed for longer than a predefined timeout threshold (e.g., more than five minutes). However, the conditions for activating the on-demand eviction process 820 has been modified to take into account two sets of conditions and will activate the eviction job if either of the two conditions are not met. First, the on-demand eviction process 820 monitors whether the local cache has sufficient capacity to store new data. Second, the on-demand eviction process monitors whether the overall capacity of the local PMEM storage has been consumed beyond a predefined threshold. This overall consumed capacity of the local PMEM refers to the combined utilization of the local PMEM by the portion that has been allocated as the local PMEM storage and the portion that has been allocated to be used as the local cache. Thus, according to the modified on-demand eviction process 820, if at any time the local cache capacity becomes insufficient to store new data or the local PMEM is consumed beyond the predefined threshold, the on-demand eviction job will be activated to evict all closed objects from the local cache, and if the local cache still has not freed up sufficient capacity to store new data or the overall consumed capacity of the local PMEM still exceeds the predefined threshold even after the eviction of all closed objects, then evict cached chunks based on a "least-recently-used" ("LRU") protocol until sufficient space has been freed up to store the new data in the local cache and the overall consumed capacity of the local PMEM falls below the predefined threshold.

While various embodiments of the invention have been described above, they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, the various features and functionality described in one or more of the individual embodiments are not limited in their applicability to the particular embodiment with which they are described. They instead can be applied alone or in some combination, to one or more of the other embodiments of the disclosure, whether or not such embodiments are described, and if such features are presented as being a part of a described embodiment. Thus, the breadth and scope of the present disclosure should not be limited by any of the above-described exemplary embodiments.

In this document, the terms "module" and "engine" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

The invention claimed is:

1. A persistent memory (PMEM) based distributed memory object (DMO) method, the method comprising:
    creating a PMEM server cluster comprising a plurality of PMEM servers, wherein each PMEM server includes a distributed memory object (DMO) server, a persistent memory, a processor, and a network interface to send and receive messages and data;
    creating an application server cluster comprising a plurality of application servers, wherein each application server includes a client application, a local cache, a network interface to send and receive messages and data, and a DMO agent to interface with one or more DMO servers in the PMEM server cluster;
    connecting the network interface of one or more of the plurality of PMEM servers and the network interface of one or more of the plurality application servers to enable transfer of data between the PMEM servers and the application servers, wherein the client application can write data directly to a remote PMEM server by invoking the DMO agent to communicate with a DMO server on one or more of the PMEM servers and then using an offload write function to write the data directly on the PMEM server, wherein the DMO agent acts as an object node owner and a client proxy in carrying out a plurality of input-output operations for the application server and locally synchronizes data that the application server requested to be a memory mapped, wherein the object node owner is configured to select, by a cluster manager, an initial object node group to contain the DMO agent and for assigning a plurality of chunk replicas (CRs) within that object node group; and
    writing, by the client application, multiple replicas of the data on different PMEM servers.

2. The method of claim 1, wherein the offload write is an RDMA write.

3. The method of claim 1, wherein each chunk is stored to more than one PMEM servers simultaneously.

4. The method of claim 1, wherein the DMO agent distributes data chunks of the replicas on a multiple PMFM servers.

5. A persistent memory (PMEM) based distributed memory object (DMO) method, the method comprising:
    creating a PMEM server duster comprising a plurality of PMEM servers, wherein each PMEM server includes a distributed memory object (DMO) server, a persistent memory, a processor, and a network interface to send and receive messages and data;
    creating an application server cluster comprising a plurality of application servers, wherein each application server includes a client application, a local cache, a network interface to send and receive messages and data, and a DMO agent to interface with one or more DMO servers in the PMEM server cluster;
    connecting the network interface of one or more of the plurality of PMEM servers and the network interface of one or more of the plurality application servers to enable transfer of data between the PMEM servers and the application servers, wherein when the client application requests a read of an object, the DMO agent further comprising checking if the data exists in the local cache, and if so, the client application reading the data from the local cache, and if the data does not reside in the local cache, the DMO agent further comprising identifying the data chunks containing the requested data and pulling the data chunks from a remote PMEM server and returning requested data to the client application, wherein the DMO agent acts as an object node owner and a client proxy in carrying out a plurality of input-output operations for the application server and locally synchronizes data that the application server requested to be a memory mapped, wherein the object node owner is configured to select, by a cluster manager, an initial object node group to contain the DMO agent and for assigning a plurality of chunk replicas (CRs) within that object node group; and
    writing, by the client application, multiple replicas of the data on different PMEM servers.

6. The method of claim 5, wherein when the requested data is not in the local cache, the DMO agent further retrieving the entire chunk that contains the requested data.

7. The method of claim 5, wherein each the data is retrieved using an RDMA read operation.

8. The method of claim 5, further comprising running a cache eviction of the local cache on a timed schedule.

9. The method of claim 8, wherein the cache eviction is run on a timeout threshold for all objects that have been closed for the duration of the timed schedule.

10. The method of claim 5, further comprising running a cache eviction of the local cache if a new data chunk fails to be allocated in the local cache due to a lack of space in the local cache.

11. The method of claim 9, wherein if a data chunk fails to be allocated after the cache eviction of the local cache, running a cache eviction for all closed objects.

12. A PMEM-based distributed memory object system comprising:
    a PMEM server cluster comprising a plurality of PMEM servers, wherein each pMEM server includes a distributed memory object (DMO) server, a persistent memory, a processor, and a network interface to send and receive messages and data;

an application server cluster comprising a plurality of application servers, wherein each application server includes a client application, a local cache, a network interface to send and receive messages and data, and a DMO agent to interface with one or more DMO servers in the PMEM server cluster; and a data network to connect the network interface of one or more of the plurality of PMEM servers and the network interface of one or more of the plurality application servers to enable transfer of data between the PMEM servers and the application servers, wherein the client application can write data directly to a remote PMEM server by invoking the DMO agent to communicate with a DMO server on one or more of the PMEM servers and then using an offload write function to write the data directly on the PMEM server, wherein the DMO agent acts as an object node owner and a client proxy in carrying out a plurality of input-output operations for the application server and locally synchronizes data that the application server requested to be a memory mapped, wherein the object node owner is configured to select, by a cluster manager, an initial object node Group to contain the DMO agent and for assigning a plurality of chunk replicas (CRs) within that object node group wherein the client application writes multiple replicas of the data on different PMEM servers.

13. The system of claim 12, wherein the offload write is an RDMA write.

14. The system of claim 12, wherein each chunk is stored to more than one PMEM servers simultaneously.

15. The system of claim 12, wherein the DMO agent distributes data chunks of the replicas on a multiple PMEM servers.

16. A persistent memory (PMEM) based distributed memory object (DMO) system comprising:

a PMEM server cluster comprising a plurality of PMEM servers, wherein each PMEM server includes a distributed memory object (DMO) server, a persistent memory, a processor, and a network interface to send and receive messages and data;

an application server cluster comprising a plurality of application servers, wherein each application server includes a client application, a local cache, a network interface to send and receive messages and data, and a DMO agent to interface with one or more DMO servers in the PMEM server cluster; and a data network to connect the network interface of one or more of the plurality of PMEM servers and the network interface of one or more of the plurality application servers to enable transfer of data between the PMEM servers and the application servers, wherein when a client application requests a read of an object, the DMO agent is configured to check if the data exists in the local cache, and if so, the client application reads the data from the local cache, and if the data does not reside in the local cache, the DMO agent identifies the data chunks containing the requested data and pulls the data chunks from a remote PMEM server and returns the requested data to the client application, wherein the DMO agent acts as an object node owner and a client proxy in carrying out a plurality of input-output operations for the application server and locally synchronizes data that the application server requested to be a memory mapped, wherein the object node owner is configured to select, by a cluster manager, an initial object node group to contain the DMO agent and for assigning a plurality of chunk replicas (CRs) within that object node group, wherein the client application writes multiple replicas of the data on different PMEM servers.

17. The system of claim 16, wherein when the requested data is not in the local cache, the DMO agent further retrieves the entire chunk that contains the requested data.

18. The system of claim 16, wherein each the data is retrieved using an RDMA read operation.

19. The system of claim 16, wherein the DMO agent is configured to run a cache eviction of the local cache on a timed schedule.

20. The system of claim 19, wherein the cache eviction is run on a timeout threshold for all objects that have been closed for the duration of the timed schedule.

21. The system of claim 16, wherein the DMO agent is configured to run a cache eviction of the local cache if a new data chunk fails to be allocated in the local cache due to a lack of space in the local cache.

22. The system of claim 21, wherein if a data chunk fails to be allocated after the cache eviction of the local cache, the DMO agent runs a cache eviction for all closed objects.

23. A persistent memory-based distributed memory object method comprising:

running one or more DMO services which run in a PMEM server cluster, wherein the PMEM server cluster comprises one or more PMEM servers each having a persistent memory;

running one or more DMO agents which run in an application server cluster, wherein the application server cluster comprises one or more application servers;

configuring the DMO agents to interface between one or more client applications installed on the application servers and the DMO services via a network, manage cached memory on the application servers, and output data to the client applications; and configuring the DMO services to receive data service requests from the DMO agents, coordinate data storage to the persistent memory of one or more PMEM servers, and provide persistent memory-based data services to the application servers via the network, wherein the DMO agent acts as an object node owner and a client proxy in carrying out a plurality of input-output operations for the application server and locally synchronizes data that the application server requested to be a memory mapped, wherein the object node owner is configured to select, by a cluster manager, an initial object node group to contain the DMO agent and for assigning a plurality of chunk replicas (CRs) within that object node group, wherein the client application writes multiple replicas of the data on different PMEM servers.

24. The persistent memory-based distributed memory object method of claim 23, wherein:

configuring the DMO services to receive data service requests from the DMO agents, coordinate data storage to the persistent memory of one or more PMEM servers, and provide persistent memory-based data services to the application servers via the network comprises:

requesting the DMO agents to store cached memory from the applications to the persistent memory of the PMEM servers; and memory mapping location of data on the persistent memory of the PMEM servers; and configuring the DMO services to receive data service requests from the DMO agents, coordinate data storage to the persistent memory of one or more PMEM servers, and provide persistent memory-based data services to the application servers via the network comprises:

receiving request to store cached memory from the applications to the persistent memory of the PMEM servers;

allocating memory on the persistent memory of the PMEM servers for storing data transferred from the application servers via the network; and storing data transferred from the application servers via the network to the persistent memory of the PMEM servers.

25. The persistent memory-based distributed memory object method of claim 24, further comprising:

storing one or more replicas of cached memory of the application servers to the persistent memory of the PMEM servers.

26. The persistent memory-based distributed memory object method of claim 25, wherein the replicas are stored to one PMEM server at a time.

27. The persistent memory-based distributed memory object method of claim 25, wherein the replicas are stored to multiple PMEM servers simultaneously.

28. The persistent memory-based distributed memory object method of claim 23, wherein the network is a data network with greater than 1 GB/s throughput to each of the application servers.

29. The persistent memory-based distributed memory object method of claim 23, wherein the network is a remote direct memory access-enabled network that enables the client application to directly write data to the persistent memory of the PMEM servers.

30. The persistent memory-based distributed memory object method of claim 23, wherein:

configuring the DMO services to receive data service requests from the DMO agents, coordinate data storage to the persistent memory of one or more PMEM servers, and provide persistent memory-based data services to the application servers via the network comprises:

requesting the DMO service to send requested data stored on the persistent memory of the PMEM servers to cached memory of the application servers; and configuring the DMO services to receive data service requests from the DMO agents, coordinate data storage to the persistent memory of one or more PMEM servers, and provide persistent memory-based data services to the application servers via the network comprises:

sending requested data stored on the persistent memory of the PMEM servers to cached memory of the application servers;

mapping cached memory location of the requested data; and returning the requested data to the client applications.

31. The persistent memory-based distributed memory object method of claim 30, wherein:

sending requested data stored on the persistent memory of the PMEM servers to cached memory of the application servers comprises sending complete chunks that contain the requested data.

* * * * *